(12) United States Patent
Kim et al.

(10) Patent No.: US 11,848,447 B2
(45) Date of Patent: Dec. 19, 2023

(54) MULTI LAYER ELECTRODE FOR SECONDARY BATTERY

(71) Applicant: SK Innovation Co., Ltd., Seoul (KR)

(72) Inventors: Jeong A Kim, Daejeon (KR); Byoung Ho Ko, Daejeon (KR)

(73) Assignee: SK ON CO., LTD., Seoul (KR)

( * ) Notice: Subject to any disclaimer, the term of this patent is extended or adjusted under 35 U.S.C. 154(b) by 29 days.

(21) Appl. No.: 17/379,564

(22) Filed: Jul. 19, 2021

(65) Prior Publication Data
US 2022/0020987 A1    Jan. 20, 2022

(51) Int. Cl.
| | |
|---|---|
| *H01M 4/583* | (2010.01) |
| *H01M 4/62* | (2006.01) |
| *H01M 4/36* | (2006.01) |
| *C01B 32/159* | (2017.01) |
| *H01M 4/02* | (2006.01) |

(52) U.S. Cl.
CPC ........... *H01M 4/583* (2013.01); *C01B 32/159* (2017.08); *H01M 4/366* (2013.01); *H01M 4/621* (2013.01); *C01B 2202/02* (2013.01); *C01P 2004/133* (2013.01); *C01P 2006/12* (2013.01); *H01M 2004/028* (2013.01)

(58) Field of Classification Search
None
See application file for complete search history.

(56) References Cited

U.S. PATENT DOCUMENTS

2014/0332731 A1* 11/2014 Ma .................. C09D 7/70
252/506

FOREIGN PATENT DOCUMENTS

| CN | 107240713 A | * 10/2017 | |
|---|---|---|---|
| CN | 108878771 A | * 11/2018 | ........ H01M 10/0525 |
| KR | 10-2003-0013553 A | 2/2003 | |
| KR | 10-2013-0093859 A | 8/2013 | |
| KR | 10-2017-0107213 A | 9/2017 | |

OTHER PUBLICATIONS

English translation of CN-108878771-A (Year: 2018).*
English translation of CN107240713A (Year: 2017).*

* cited by examiner

*Primary Examiner* — Lucas J. O'Donnell
(74) *Attorney, Agent, or Firm* — IP & T GROUP LLP

(57) ABSTRACT

The present disclosure relates to a multilayer electrode for a secondary battery. The multilayer electrode for a secondary battery includes: an electrode current collector; a first mixture layer including an active material, a binder, and a single-walled carbon nanotube, the first mixture layer being formed on at least one surface of the electrode current collector; and a second mixture layer including an active material, a binder, and a multi-walled carbon nanotube, the second mixture layer being formed on the first mixture layer. According to the present disclosure, by improving the uniformity of the distribution of the conductive material in the electrode mixture layer, it is possible to prevent the resistance from increasing, and as a result, it is possible to improve the output characteristics of the secondary battery.

16 Claims, 6 Drawing Sheets

MULTI LAYER ELECTRODE FOR SECONDARY BATTERY

CROSS-REFERENCE TO RELATED APPLICATION(S)

This application claims the benefit under 35 USC 119 (a) of Korean Patent Application No. 10-2020-0089362 filed on Jul. 20, 2020 in the Korean Intellectual Property Office, the entire disclosure of which is incorporated herein by reference for all purposes.

BACKGROUND

1. Field

The present disclosure relates to a multilayer electrode for a secondary battery, and more particularly, to a multilayer electrode including a carbon nanotubes (CNT).

2. Description of Related Art

Recently, as demand for portable electronic products such as notebook computers, video cameras, and mobile phones has rapidly increased, and development of electric vehicles, energy storage batteries, robots, satellites, and the like has been undertaken in earnest, research into high-performance secondary batteries capable of repeatedly being charged and discharged is being actively conducted.

Currently commercialized secondary batteries include nickel cadmium batteries, nickel hydride batteries, nickel zinc batteries, and lithium secondary batteries. Thereamong, compared to nickel-based secondary batteries, lithium secondary batteries are attracting attention for their advantages of being free to charge and discharge as they do not have a charging memory effect, have a very low self-discharge rate, and have high energy density.

A lithium secondary battery has a structure in which a lithium electrolyte is impregnated in an electrode assembly comprising an anode including lithium transition metal oxide as an electrode active material, a cathode including a carbon-based active material, and a separator. In general, the anode is prepared by coating and drying an anode mixture containing lithium transition metal oxide on a current collector such as aluminum foil, or the like, and the cathode is prepared by coating and drying a cathode mixture containing a carbon-based active material on a current collector such as copper foil, or the like.

In general, a high-density electrode is formed by molding electrode active material particles having a size of several μm to several tens of μm in a high-pressure press, so that the particles are deformed and a space between the particles is reduced, and electrolyte permeability is easily reduced.

In order to solve this problem, a conductive material having excellent electrical conductivity and strength is used in manufacturing an electrode. When a conductive material is used for manufacturing an electrode, the conductive material is dispersed between the compressed electrode active materials, thereby maintaining micropores between the active material particles, thereby facilitating penetration of the electrolyte and reducing resistance in the electrode with excellent conductivity.

As a conductive material generally used, graphite such as natural graphite and artificial graphite; carbon black, such as carbon black, acetylene black, Ketjen black, channel black, furnace black, lamp black, and summer black; conductive fibers such as carbon derivatives such as carbon nanotubes and fullerenes, carbon fibers and metal fibers; metal powders such as carbon fluoride powder, aluminum powder, and nickel powder; conductive whiskers such as zinc oxide and potassium titanate; conductive metal oxides such as titanium oxide; and conductive materials such as polyphenylene derivatives may be used. Recently, carbon nanotubes, which are fibrous carbon-based conductive materials capable of further reducing electrode resistance by forming an electrically conductive path within an electrode, are increasing.

Carbon nanotubes, a type of fine carbon fiber, are tubular carbon fibers having a diameter of 1 μm or less, and are expected to be applied and put to practical use in various fields due to their high conductivity, tensile strength, and heat resistance due to their specific structure.

Even when an electrode is manufactured by applying carbon nanotubes as a conductive material, as in a conventional electrode manufacturing method, an electrode mixture prepared by dispersing an electrode active material, a conductive material, a binder, and the like in a dispersion medium is coated and dried on a current collector to manufacture an electrode. When the mixture layer coated on the current collector is dried, as the dispersion medium in the mixture layer evaporates, the binder moves to the surface together with the dispersion medium. Accordingly, distribution of the binder in the mixture layer, especially the distribution of the binder in a thickness direction becomes uneven, so that there may be problems in which adhesive force of the electrode deteriorates, and input/output characteristics of the battery are deteriorated, thereby requiring a solution to such a problem.

SUMMARY

The present disclosure has been devised to solve the above problems, and it is intended to provide an electrode having a multilayer structure capable of improving non-uniformity in distribution of a conductive material when an electrode including CNT as a conductive material is manufactured, and a secondary battery including the same.

According to an aspect of the present disclosure, a multilayer electrode for a secondary battery is provided. The multilayer electrode for a secondary battery includes: an electrode current collector; a first mixture layer including an active material, a binder, and a single-walled carbon nanotube, the first mixture layer being formed on at least one surface of the current collector; and a second mixture layer including an active material, a binder, and a multi-walled carbon nanotube, the second mixture layer being formed on the first mixture layer.

The electrode may further include one or more mixture layers including an active material, a binder, and a multi-walled carbon nanotube, and sequentially stacked on the second mixture layer.

An amount of the multi-walled carbon nanotubes may decrease as a distance from the second mixture layer increases in a stacking direction of the electrode current collector.

A BET of the single-walled carbon nanotube may be greater than a BET of the multi-walled carbon nanotube, and an average diameter of the single-walled carbon nanotube may be smaller than an average diameter of the multi-walled carbon nanotube.

The single-walled carbon nanotubes may have a BET of 200 m$^2$/g to 1000 m$^2$/g, and an average diameter of 0.1 nm to 5 nm.

The multi-walled carbon nanotubes may have a BET of 100 $m^2/g$ to 700 $m^2/g$, and an average diameter of 1 nm to 10 nm.

The single-walled carbon nanotubes may be included in an amount of 0.01 to 5% by weight based on the total weight of the first electrode mixture layer.

The multi-walled carbon nanotubes may be included in an amount of 0.1 to 10% by weight based on the total weight of the second electrode mixture layer.

The electrode may be a positive electrode.

BRIEF DESCRIPTION OF DRAWINGS

The above and other aspects, features, and advantages of the present inventive concept will be more clearly understood from the following detailed description, taken in conjunction with the accompanying drawings, in which.

DETAILED DESCRIPTION

Hereinafter, preferred embodiments of the present disclosure will be described with reference to various examples. However, the embodiments of the present disclosure may be modified in various other forms, and the scope of the present disclosure is not limited to the embodiments described below.

Figure 1:
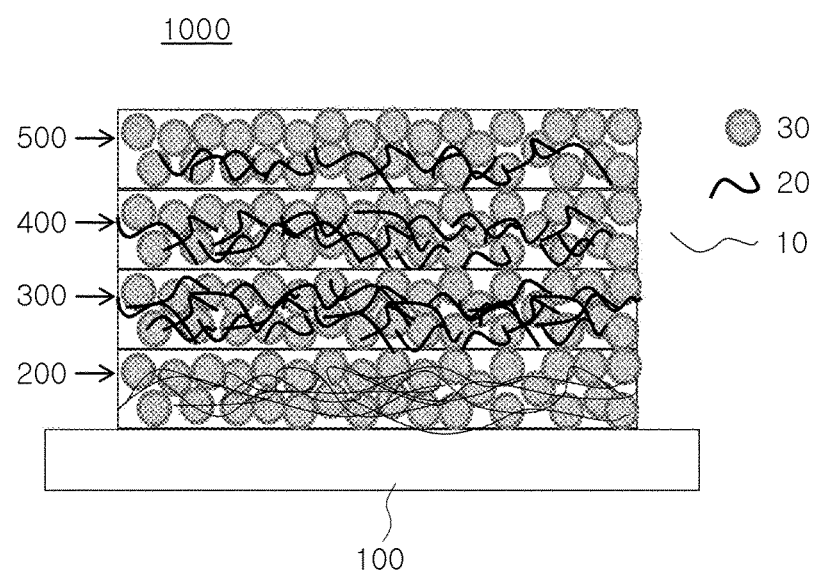
FIG. 1 is a schematic diagram schematically illustrating a multilayer anode according to the present disclosure.

The present disclosure relates to a multilayer electrode for a secondary battery. FIG. 1 is a schematic diagram schematically illustrating a multilayer electrode according to an embodiment of the present disclosure. Hereinafter, the present disclosure will be described in more detail with reference to FIG. 1.

According to an aspect of the present disclosure, an electrode for a secondary battery 1000 is provided. The electrode for a secondary battery 1000 includes; an electrode current collector 100; a first mixture layer 200 including an active material 30, a binder (not shown), and a single-walled carbon nanotube 10, the first mixture layer 200 being formed on at least one surface of the electrode current collector 100; and a second mixture layer 300 including an active material 30, a binder, and a multi-walled carbon nanotube 20, the second mixture layer 300 being formed on first mixture layer 200.

The electrode 1000 according to the present disclosure may be an anode or a cathode. Meanwhile, when the electrode 1000 in the present disclosure is an anode, it is not particularly limited as the electrode current collector 100, but a thin plate made of aluminum, stainless steel or nickel may be used, and it is preferable to use a thin plate made of aluminum. In addition, a porous body such as a mesh or mesh shape may be used, and may be coated with an oxidation-resistant metal or alloy film to prevent oxidation.

A first mixture layer 200 including an active material 30, a binder, and a single-walled carbon nanotube 10 as a conductive material is formed on at least one surface of the current collector 100. In addition, a second mixture layer 300 including an active material 30, a binder, and a multi-walled carbon nanotube 20 is formed on the first mixture layer 200.

Single-walled carbon nanotubes have a single-walled tube form made of carbon atoms and have excellent electrical conductivity and thermal conductivity, and multi-walled nanotubes have a form of a tube with several layers of walls made of carbon atoms in one tube, and as compared to single-walled carbon nanotubes, the multi-walled nanotubes have slightly inferior electrical and thermal properties, but excellent mechanical properties and easy fabrication. In the present disclosure, a single-walled carbon nanotube 10 having excellent electrical conductivity is used as a conductive material on the first mixture layer 200, closest to the current collector 100, and a multi-walled carbon nanotube 20 is used as a conductive material on a second mixture layer formed on the first mixture layer 200, it is possible to improve non-uniformity of the distribution of the conductive material due to a migration phenomenon that occurs when the electrode is dried. In addition, as will be described later, it is formed by being sequentially stacked on the second mixture layer, and one or more mixture layers including an active material 30, a binder, and a multi-walled carbon nanotube 20 are further included, and an amount of the carbon nanotubes 20 may decrease as a distance from the second mixture layer 300 increases in a stacking direction of the electrode current collector 100, so that the non-uniformity of the distribution of the conductive material can be more remarkably improved.

The single-walled carbon nanotubes 10 may be included in an amount of 0.01 to 5% by weight, more preferably 0.05 to 3% by weight, based on the total weight of the first mixture layer 200. If it is less than 0.01% by weight, it may be difficult to ensure the conductivity of the mixture layer, whereas if it is more than 5% by weight, the viscosity increases during slurry preparation, making it difficult to form a multilayer electrode or as a solid content of the slurry decreases, in a drying process, problems such as non-drying, cracking, and the like, may occur.

The multi-walled carbon nanotubes 20 included in the second mixture layer 300 may be included in an amount of 0.1 to 10% by weight, preferably 0.1 to 5% by weight, based on the total weight of the second electrode mixture layer. If it is less than 0.1% by weight, it may be difficult to ensure the conductivity of the mixture layer, and if exceeds 10% by weight, the viscosity increases during slurry preparation, making it difficult to form a multilayer electrode or as the solid content of the slurry decreases, problems such as non-drying, cracking, and the like may occur.

Meanwhile, it is preferable that the BET of the single-walled carbon nanotube 10 is greater than the BET of the multi-walled carbon nanotube 20, and the average diameter of the single-walled carbon nanotube 10 is smaller than the average diameter of the multi-walled carbon nanotube 20. More specifically, the single-walled carbon nanotubes 10 may have a BET of 200 $m^2/g$ to 1000 $m^2/g$, and an average diameter of 0.1 nm to 5 nm. If the BET of the single-walled carbon nanotubes 10 is less than 200 $m^2/g$, it may be difficult to secure the conductivity of the mixture layer, and if it exceeds 1000 $m^2/g$, it is difficult to secure the dispersibility of the carbon nanotubes during slurry preparation, rather, the conductivity of the mixture layer may be reduced. In addition, if the average diameter of the single-walled carbon nanotubes 10 is less than 0.1 nm, it may be difficult to ensure the conductivity of the mixture layer, and if it exceeds 5 nm, it is difficult to secure the dispersibility of the carbon nanotubes during slurry preparation, rather, the conductivity of the mixture layer may be reduced.

In addition, the multi-walled carbon nanotubes 20 may have a BET of 100 $m^2/g$ to 700 $m^2/g$, and an average diameter of 1 nm to 10 nm. When the BET of the multi-walled carbon nanotubes 20 is less than 100 $m^2/g$, it may be difficult to secure the conductivity of the mixture layer, whereas, when it exceeds 700 $m^2/g$, it is difficult to secure the dispersibility of the carbon nanotubes during slurry preparation, rather, so the conductivity of the mixture layer may be reduced. In addition, when the average diameter is less than 1 nm, it is difficult to secure the conductivity of the mixture layer, and it may be difficult to form a multilayer electrode structure, and when the average diameter exceeds 10 nm, it is difficult to secure the dispersibility of the carbon nanotubes during slurry preparation, rather, so the conductivity of the mixture layer may be reduced.

Meanwhile, according to another embodiment of the present disclosure, one or more mixture layers including an active material 30, a binder and a multi-walled carbon nanotube 20 and sequentially stacked on the second mixture layer 300 may further be formed.

In this case, the content of the multi-walled carbon nanotubes 20 is preferably configured to decrease as the distance increases from the second mixture layer 300 in the stacking direction of the electrode current collector 100, and accordingly, the non-uniformity of the distribution of the conductive material due to a migration phenomenon occurring during drying of the electrode may be improved.

As described above, in the present disclosure, a multilayer electrode using carbon nanotubes as a conductive material may be configured, but the uniformity of the conductive material distribution in the electrode mixture layer can be improved by controlling the physical properties and content thereof.

Meanwhile, the active material 30 included in the first, second, and plurality of electrode mixture layers may be the same or different, and the type thereof is not particularly limited. For example, in the case of an anode, the active material may include at least one selected from a group consisting of lithium cobalt oxide, lithium nickel cobalt manganese oxide, lithium nickel cobalt aluminum oxide, lithium iron phosphate, and lithium manganese oxide, but is not particularly limited thereto, and any positive active material available in the art may be used.

In addition, the anode active material may be a compound represented by the following formula: $Li_aA_{1-b}M_bD_2$ (wherein, $0.90 \le a \le 1.8$, $0 \le b \le 0.5$); $Li_aE_{1-b}MbO_{2-c}D_c$ (wherein, $0.90 \le a \le 1.8$, $0 \le b \le 50.5$, $0 \le c \le 0.05$); $LiE_{2-b}M_bO_{4-c}D_c$ (wherein, $0 \le b \le 0.5$, $0 \le c \le 0.05$); $LiaNi_{1-b-c}Co_bM_cD_\alpha$ (wherein, $0.90 \le a \le 1.8$, $0 \le b \le 0.5$, $0 \le c \le 0.05$, $0 \le \alpha \le 2$); $Li_aNi_{1-b-c}Co_bMcO_{2-\alpha}X_\alpha$ (wherein, $0.90 \le a \le 1.8$, $0 \le b \le 0.5$, $0 \le c \le 0.05$, $0 < \alpha < 2$); $Li_aNi_{1-b-c}CO_bMcO_{2-\alpha}X_2$ (wherein, $0.90 \le a \le 1.8$, $0 \le b \le 0.5$, $0 \le c \le 0.05$, $0 < \alpha < 2$); $Li_aNi_{1-b-c}Mn_bM_cD_\alpha$ (wherein, $0.90 \le a \le 1.8$, $0 \le b \le 0.5$, $0 \le c \le 0.05$, $0 \le \alpha \le 2$); $Li_aNi_{1-b-c}Mn_bM_cO_{2-\alpha}X_\alpha$ (wherein, $0.90 \le a \le 1.8$, $0 \le b \le 0.5$, $0 \le c \le 0.05$, $0 < \alpha < 2$); $Li_aNi_{1-b-c}Mn_bM_cO_{2-\alpha}X_2$ (wherein, $0.90 \le a \le 1.8$, $0 \le b \le 0.5$, $0 \le c \le 0.05$, $0 < \alpha < 2$); $Li_aNi_bE_cGdO_2$ (wherein, $0.90 \le a \le 1.8$, $0 \le b \le 0.9$, $0 \le c \le 0.5$, $0.001 \le d \le 0.1$); $Li_aNi_bCo_cMn_dGeO_2$ (wherein, $0.90 \le a \le 1.8$, $0 \le b \le 0.9$, $0 \le c \le 0.5$, $0 \le d \le 0.5$, $0.001 \le e \le 0.1$); $Li_aNiG_bO_2$ (wherein, $0.90 \le a \le 1.8$, $0.001 \le b \le 0.1$); $Li_aCoG_bO_2$ (wherein, $0.90 \le a \le 1.8$, $0.001 \le b \le 0.1$); $Li_aMnG_bO_2$ (wherein, $0.90 \le a \le 1.8$, $0.001 \le b \le 0.1$); $Li_aMn_2G_bO_4$ (wherein, $0.90 \le a \le 1.8$, $0.001 \le b \le 0.1$); $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0 \le f \le 2$); $Li_{(3-f)}Fe_2(PO_4)_3$ (wherein, $0 \le f \le 2$); and $LiFePO_4$. In the above formula, A is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; J is V, Cr, Mn, Co, Ni, or Cu.

The positive active material may also include $LiCoO_2$, $LiMn_xO_{2x}$ (wherein, x=1 or 2), $LiNi_{1-x}Mn_xO_{2x}$ (wherein, $0<x<1$), $LiNi_{1-x-y}Co_xMn_yO_2$ (wherein, $0 \le x \le 0.5$, $0 \le y \le 0.5$), $LiFePO_4$, $TiS_2$, $FeS_2$, $TiS_3$, or $FeS_3$, but is not limited thereto.

In addition, the mixture layer may include a binder to improve bonding strength with an active material, a conductive material, and the like, and the binder may be the same or different, and the type thereof is not particularly limited. For example, there may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene, polypropylene, ethylene-propylene-Dientepolymer (EPDM), sulfonated EPDM, styrene butadiene rubber, fluororubber, various copolymers, and the like, but are not limited thereto.

A method of manufacturing the electrode for a secondary battery of the present disclosure is not particularly limited, and may be performed by a known method. For example, after forming a first electrode mixture layer by applying and drying a first slurry including an electrode active material, a binder, and a conductive material in a solvent on an electrode current collector by bar coating, casting, spraying, or the like, it may be prepared by applying and drying a second slurry including an electrode active material, a binder, and a conductive material in a solvent on the electrode mixture layer by a method such as bar coating, casting, spraying, or the like, and then performing rolling.

Meanwhile, according to another aspect of the present disclosure, there is provided a secondary battery including the electrode. For example, when the electrode is an anode, by improving the uniformity of the distribution of the conductive material in the anode mixture layer, the resistance is prevented from increasing, and as a result, the output characteristics of the secondary battery are improved. In addition, by using carbon nanotubes, excellent conductive performance can be achieved even with a small amount of conductive material, and thus, there is an advantage in that the energy density of the secondary battery can be increased by a relative increase in the amount of active material used.

Hereinafter, the present disclosure will be described in more detail with reference to Examples. The following examples are provided to explain the present disclosure in more detail, and the present invention is not limited thereto.

EXAMPLE

Example 1

$LiNi_{0.6}Mn_{0.2}Co_{0.2}O_2$ as a cathode active material, PVDF as a binder, and a single-walled carbon nanotube (diameter: 1 nm, BET: 400 $m^2/g$) as a conductive material were mixed and dispersed in N-methyl prollidone (NMP), which is a dispersion medium, in a weight ratio of 98.3:1.5:0.1 to prepare a first anode slurry (solid content concentration: 72%) for forming an anode active material.

After coating the first anode slurry on an aluminum foil, the second anode slurry was applied and dried, and then pressurized to prepare an anode.

Example 2

After coating the first and second anode slurries of Example 1 on aluminum foil, $LiNi_{0.6}Mn_{0.2}Co_{0.2}O_2$ as an anode active material, PVDF as a binder, and a multi-wall carbon nanotube (diameter: 5 nm, BET: 220 m$^2$/g) as a conductive material/g) was mixed and dispersed in N-methyl pyrrolidone (NMP) as a dispersion medium in a weight ratio of 97.9:1.5:0.6 to prepare a third anode slurry (solids concentration: 72%) for forming an anode active material layer. Then, it was applied on the anode slurry. Thereafter, drying and pressurization were performed to prepare an anode.

Comparative Example 1

An anode was manufactured in the same manner as in Example 1, except that only a third anode slurry was coated on an aluminum foil, dried and pressurized to prepare an anode. An interfacial resistance between the current collector and the mixture layer of the anode according to Examples 1 and 2 and Comparative Example 1 and a bulk resistance inside the mixture layer were measured and shown in Table 1 below.

TABLE 1

|  | Bulk (mixture layer) resistance (Ω · cm) | Interfacial resistance (Ω · cm$^2$) |
| --- | --- | --- |
| Example 1 | 8.4 | 0.153 |
| Example 2 | 3.8 | 0.147 |
| Comparative Example 1 | 11.7 | 0.177 |

As can be seen from Table 1, in Example 1 of a two-layer structure of the present disclosure, it can be confirmed that an interfacial resistance between a current collector and a mixture layer of an anode and bulk resistance characteristics inside the mixture layer were improved compared to Comparative Example 1. In addition, in Example 1 of a three-layer structure, it can be confirmed that interfacial resistance and bulk resistance properties compared to those in Example 1.

Figure 2:
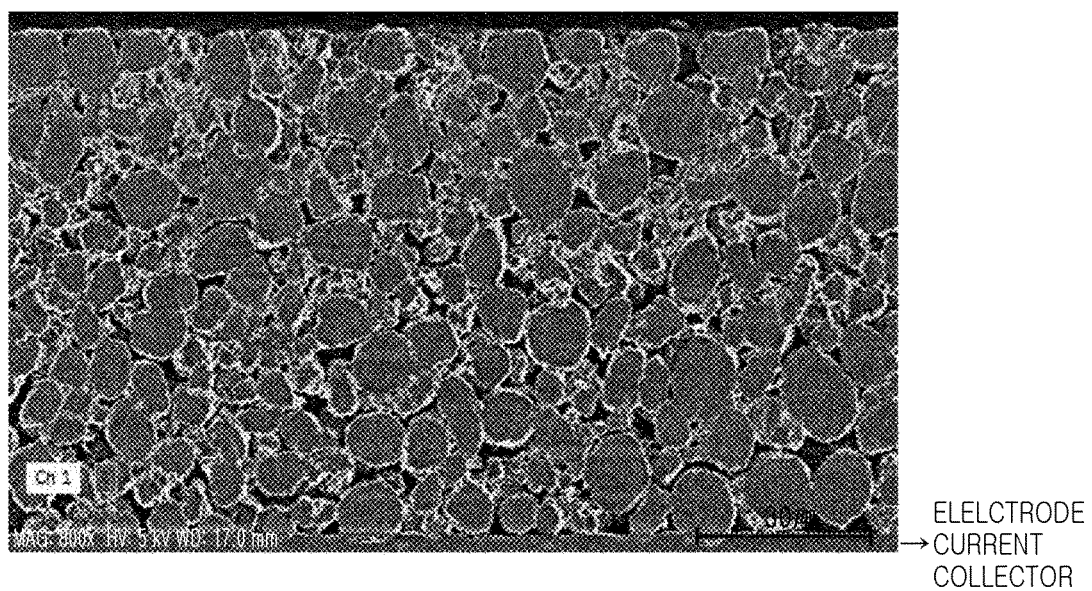
FIG. 2 shows a scanning electron microscope (SEM) photograph of an anode according to a Comparative example of the present disclosure.
Figure 3:
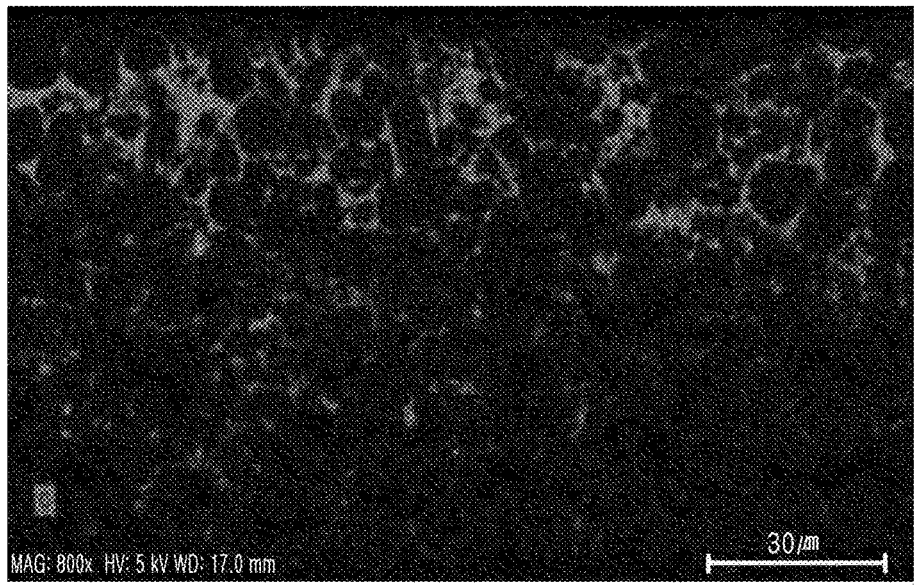
FIGS. 3 (a) and 3(b) show an Energy Dispersive Spectrometer (EDS) mapping image of an anode according to a Comparative example of the present disclosure.
Figure 3:
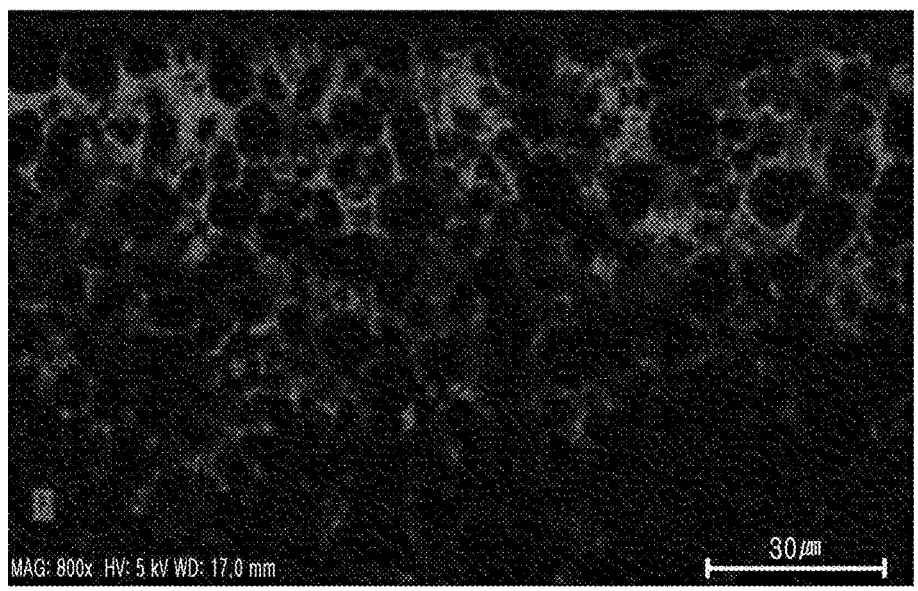

FIG. 2 is an SEM photograph of an anode according to a Comparative Example of the present disclosure, and FIGS. 3 (a) and 3(b) illustrate EDS mapping images. Referring thereto, in the case of the Comparative Example, it can be confirmed that most of carbon nanotubes are clustered and distributed on an electrode surface.

Figure 4:
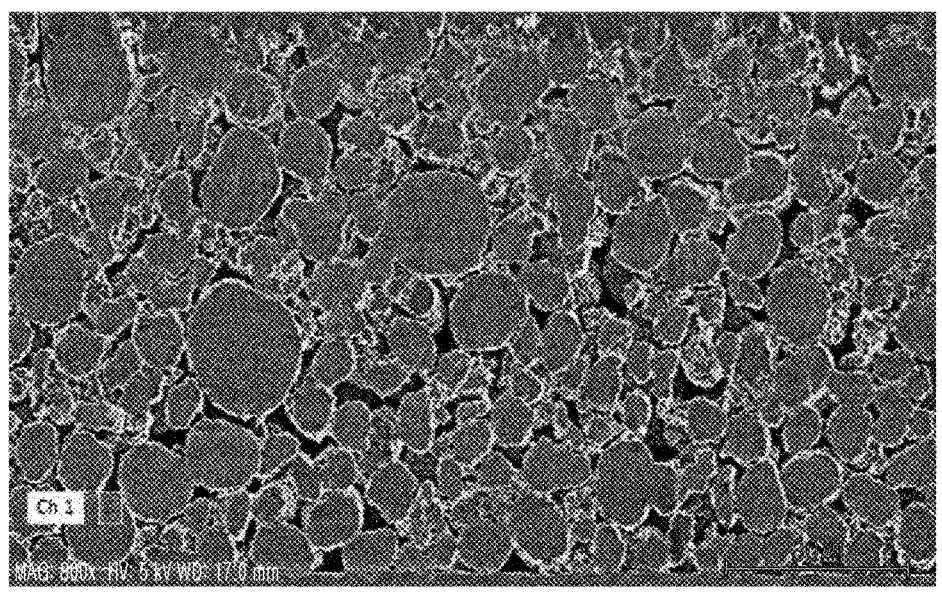
FIG. 4 is an SEM photograph of the anode according to Example 1 of the present disclosure.
Figure 5A:
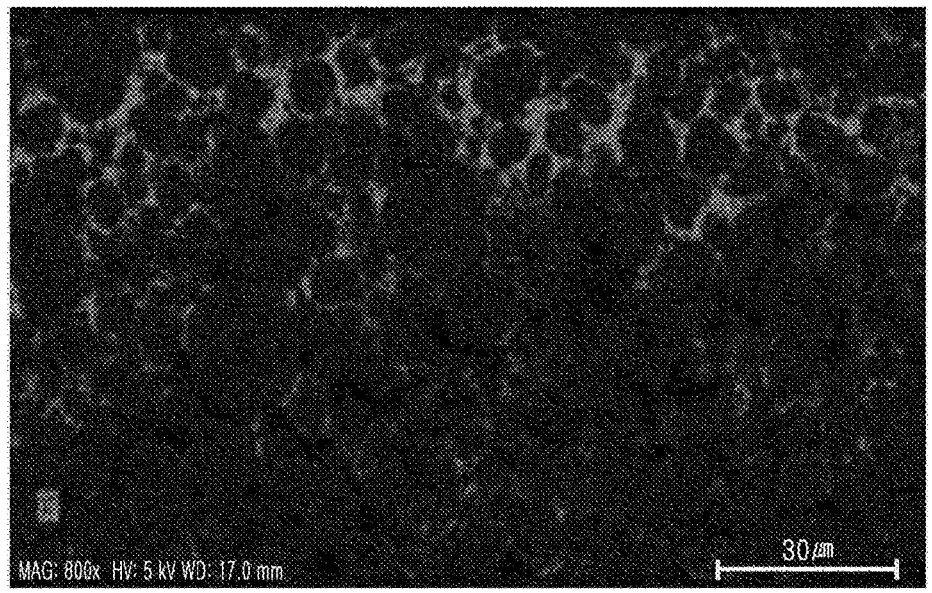
FIGS. 5 (a) and 5(b) show EDS mapping images of the anode according to Example 1.
Figure 5B:
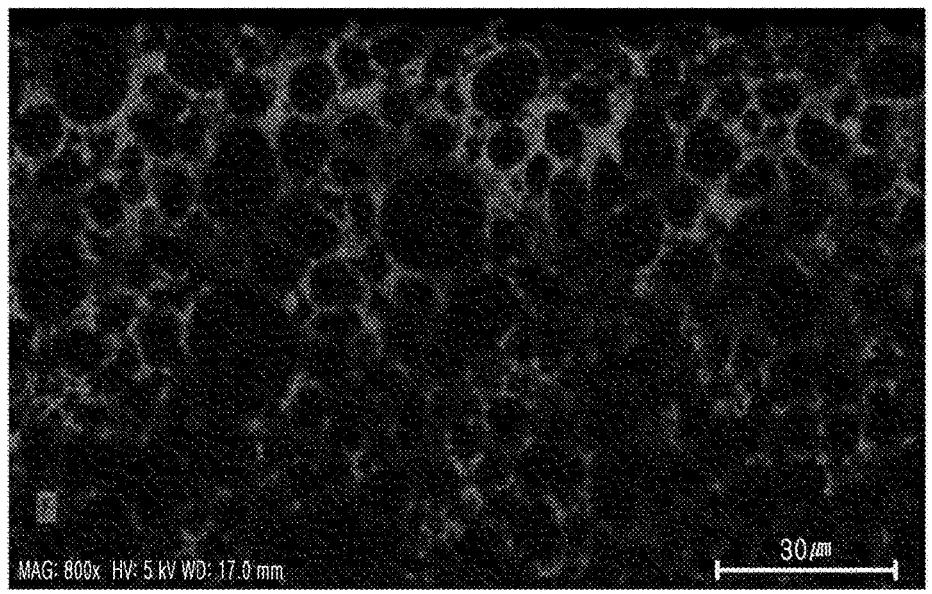

Meanwhile, FIG. 4 is an SEM photograph of the anode according to Example 1 of the present disclosure, and FIGS. 5 (a) and 5(b) illustrate EDS mapping images of the anode according to Example 1. Referring thereto, compared to the Comparative Example, it can be seen that carbon nanotubes are distributed in a wider region in a depth direction from an electrode surface toward a current collector, and a degree of aggregation is reduced.

Figure 6:
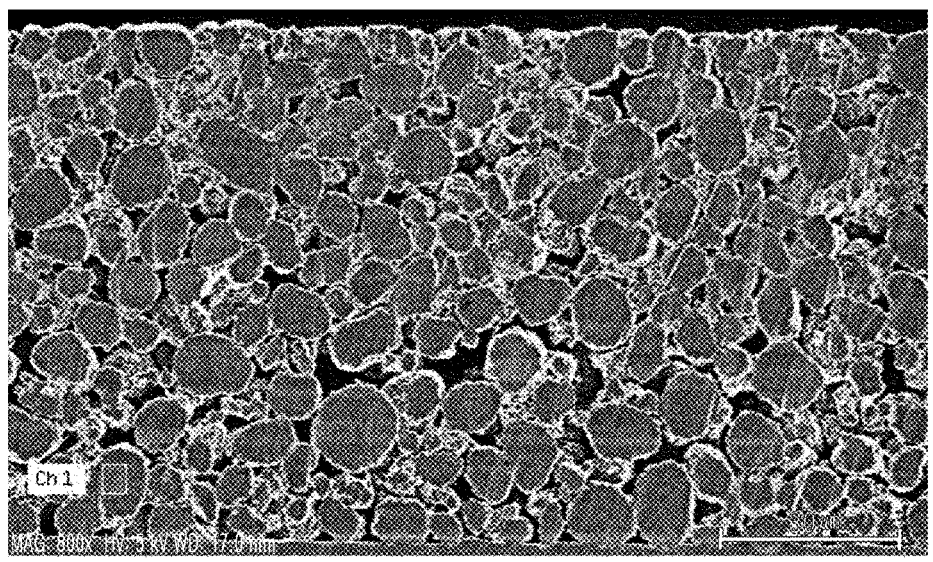
FIG. 6 shows an SEM photograph of the anode according to Example 2 of the present disclosure.
Figure 7A:
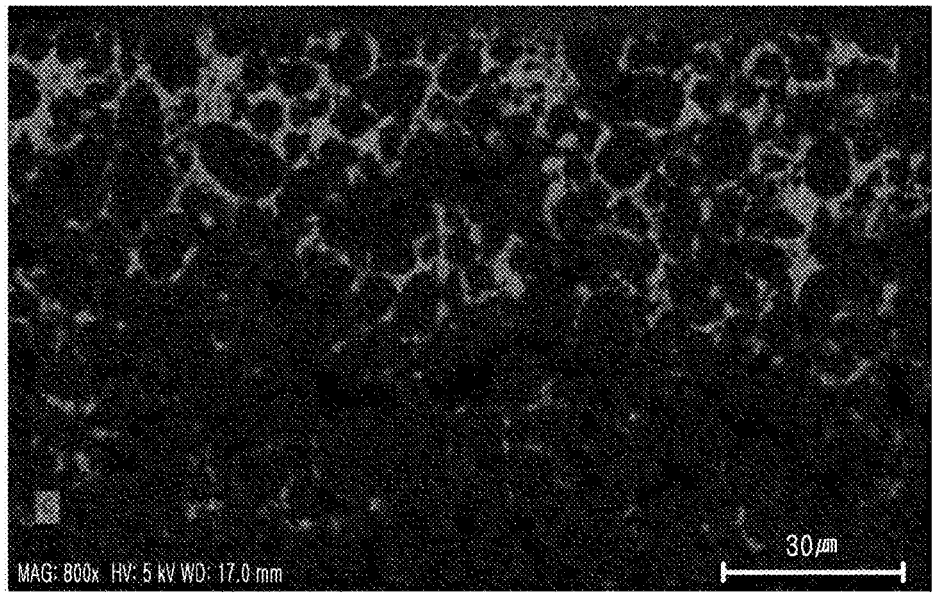
FIGS. 7 (a) and 7(b) show EDS mapping images of the anode according to Example 2 of the present disclosure.
Figure 7B:
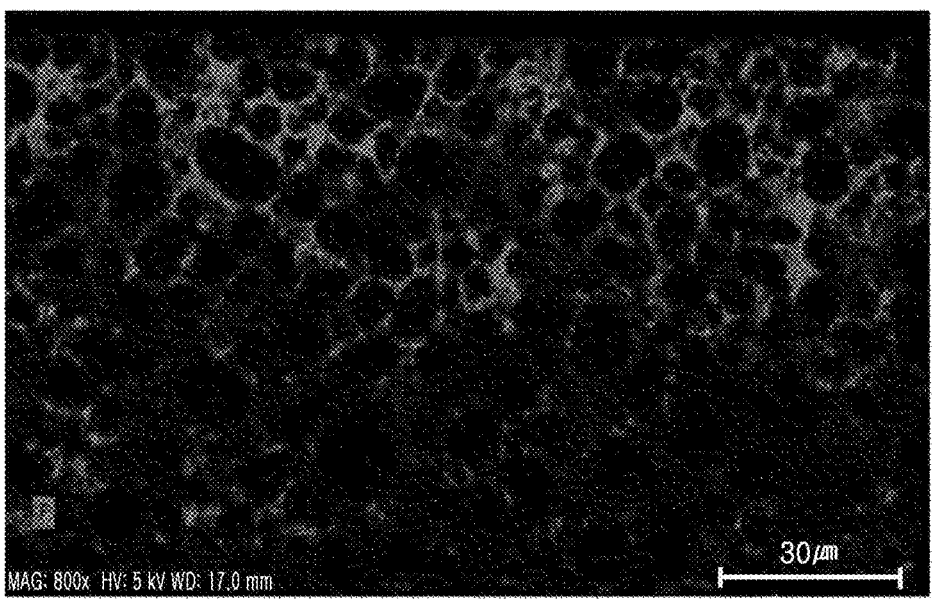

FIG. 6 is an SEM photograph of the anode according to Example 2 of the present disclosure, and FIGS. 7 (a) and 7(b) illustrate EDS mapping images of the anode according to Example 2. It can be confirmed that carbon nanotubes are distributed over a wider region in a depth direction from an electrode surface toward a current collector than in Example 1.

While this disclosure includes specific examples, it will be apparent to one of ordinary skill in the art that various changes in form and details may be made in these examples without departing from the spirit and scope of the claims and their equivalents.

DETAILED DESCRIPTION OF MAIN ELEMENTS

10: single-walled carbon nanotube
20: multi-walled carbon nanotube
30: active material
100: electrode current collector
200: first mixture layer
300: second mixture layer
400: third mixture layer
500: n$^{th}$ mixture layer
1000: electrode

What is claimed is:

1. A multilayer electrode for a secondary battery, comprising:
    an electrode current collector;
    a first mixture layer including an active material, a binder, and a first carbon nanotube consisting essentially of a single-walled carbon nanotube, the first mixture layer being formed on at least one surface of the electrode current collector; and
    a second mixture layer including an active material, a binder, and a second carbon nanotube consisting essentially of a multi-walled carbon nanotube, the second mixture layer being formed on the first mixture layer.

2. The multilayer electrode for a secondary battery of claim 1, further comprising one or more mixture layers including an active material, a binder, and a multi-walled carbon nanotube, and sequentially stacked on the second mixture layer.

3. The multilayer electrode for a secondary battery of claim 2, wherein an amount of the multi-walled carbon nanotubes decreases as a distance from the second mixture layer increases in a stacking direction of the electrode current collector.

4. The multilayer electrode for a secondary battery of claim 1, wherein a BET surface area of the single-walled carbon nanotube is greater than a BET surface area of the multi-walled carbon nanotube, and an average diameter of the single-walled carbon nanotube is smaller than an average diameter of the multi-walled carbon nanotube.

5. The multilayer electrode for a secondary battery of claim 1, wherein the single-walled carbon nanotube has a BET surface area of 200 m$^2$/g to 1000 m$^2$/g, and an average diameter of 0.1 nm to 5 nm.

6. The multilayer electrode for a secondary battery of claim 1, wherein the multi-walled carbon nanotube has a BET surface area of 100 m$^2$/g to 700 m$^2$/g, and an average diameter of 1 nm to 10 nm.

7. The multilayer electrode for a secondary battery of claim 1, wherein the single-walled carbon nanotube is included in an amount of 0.01 to 5% by weight based on the total weight of the first electrode mixture layer.

8. The multilayer electrode for a secondary battery of claim 1, wherein the multi-walled carbon nanotube is included in an amount of 0.1 to 10% by weight based on the total weight of the second electrode mixture layer.

9. The multilayer electrode for a secondary battery of claim 1, wherein the electrode is a positive electrode.

10. A multilayer electrode for a secondary battery, comprising:
an electrode current collector;
a first mixture layer including an active material, a binder, and a single-walled carbon nanotube, the first mixture layer being formed on at least one surface of the electrode current collector;
a second mixture layer including an active material, a binder, and a multi-walled carbon nanotube, the second mixture layer being formed on the first mixture layer, and
one or more mixture layers including an active material, a binder, and a multi-walled carbon nanotube, and sequentially stacked on the second mixture layer,
wherein an amount of the multi-walled carbon nanotubes decreases as a distance from the second mixture layer increases in a stacking direction of the electrode current collector.

11. The multilayer electrode for a secondary battery of claim 10, wherein a BET surface area of the single-walled carbon nanotube is greater than a BET surface area of the multi-walled carbon nanotube, and an average diameter of the single-walled carbon nanotube is smaller than an average diameter of the multi-walled carbon nanotube.

12. The multilayer electrode for a secondary battery of claim 10, wherein the single-walled carbon nanotube has a BET surface area of 200 $m^2/g$ to 1000 $m^2/g$, and an average diameter of 0.1 nm to 5 nm.

13. The multilayer electrode for a secondary battery of claim 10, wherein the multi-walled carbon nanotube has a BET surface area of 100 $m^2/g$ to 700 $m^2/g$, and an average diameter of 1 nm to 10 nm.

14. The multilayer electrode for a secondary battery of claim 10, wherein the single-walled carbon nanotube is included in an amount of 0.01 to 5% by weight based on the total weight of the first electrode mixture layer.

15. The multilayer electrode for a secondary battery of claim 10, wherein the multi-walled carbon nanotube is included in an amount of 0.1 to 10% by weight based on the total weight of the second electrode mixture layer.

16. The multilayer electrode for a secondary battery of claim 10, wherein the electrode is a positive electrode.

* * * * *